Feb. 24, 1959 M. HUGHES 2,874,736
FROZEN CONFECTION LOADER AND CONTAINER
Filed March 13, 1956 2 Sheets-Sheet 1
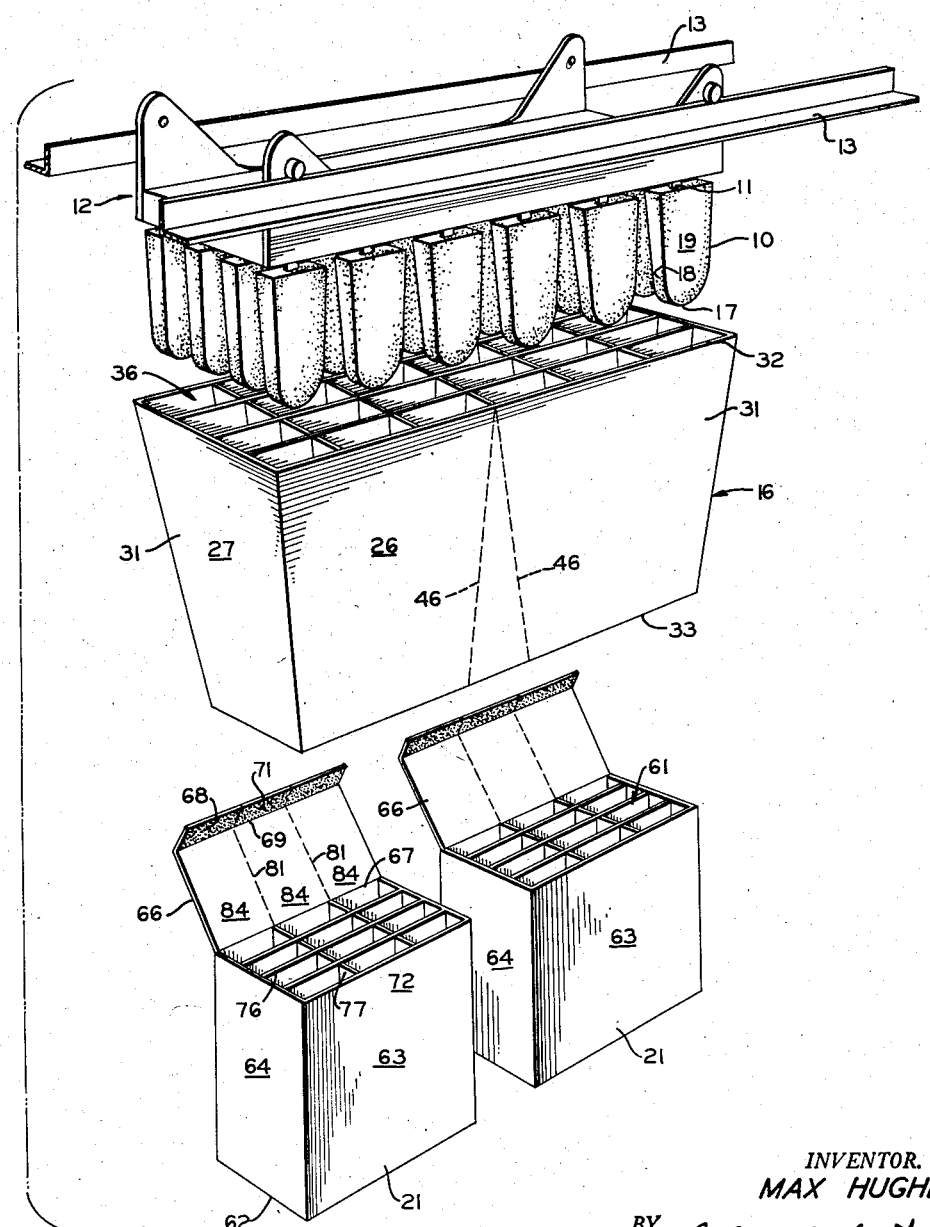
FIG_1
INVENTOR.
MAX HUGHES
BY
ATTORNEYS Feb. 24, 1959 M. HUGHES 2,874,736
FROZEN CONFECTION LOADER AND CONTAINER
Filed March 13, 1956 2 Sheets-Sheet 2
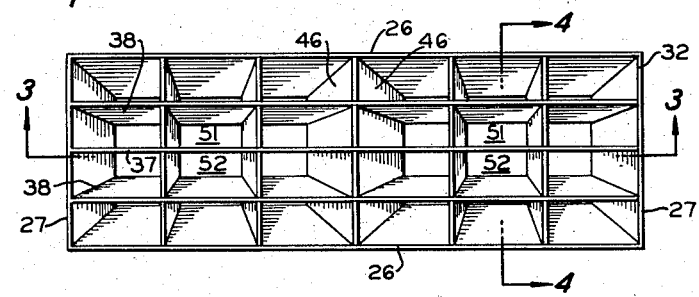
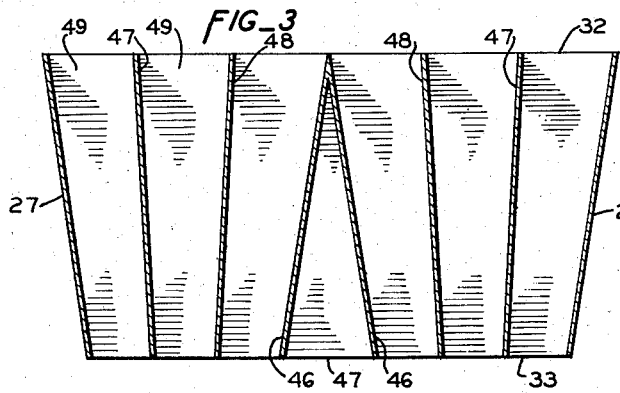
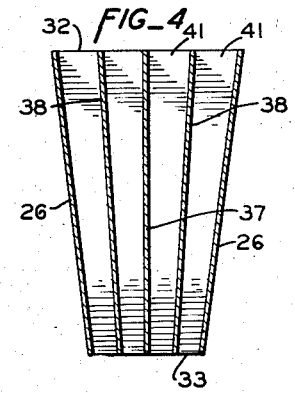
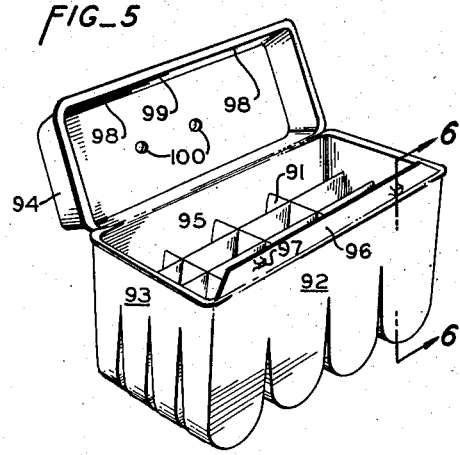
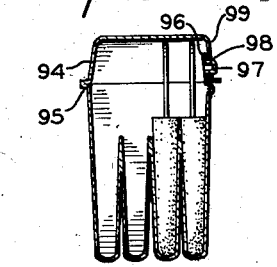
INVENTOR.
MAX HUGHES
BY
ATTORNEYS

United States Patent Office 2,874,736
Patented Feb. 24, 1959

2,874,736

FROZEN CONFECTION LOADER AND CONTAINER

Max Hughes, West Sacramento, Calif.

Application March 13, 1956, Serial No. 571,199

1 Claim. (Cl. 141—234)

The invention relates to improvements in the bulk packaging of frozen confections, and, more particularly, to mechanism for directing and guiding frozen confection bars from the stick holder to a bulk package for holding the bars in predetermined attitude and spatial relation in the container, and for rendering the bars easily available but only to the ultimate consumer.

In the latter years, food merchandising has been characterized by the phenomenal development of food outlets of very large size, the "supermarkets," and by the extensive use of frozen food cabinets within such markets.

While the sale of individual packaged frozen confection bars would seem ideally suited to the frozen food cabinet style of merchandising found in "supermarkets," it has been found, in actual practice, that human frailties negate any sales advantage which might otherwise obtain. In large markets where merchandising of individual bars in open frozen food cabinets has been attempted, children and inattentive or careless adults have selected their choice of bars and, while continuing with the often lengthy task of shopping for other foods, have frequently entirely consumed the bar prior to reaching the checking station and fail to mention the fact to the cashier.

It is therefore an object of the invention to provide a container for frozen confections which enables the proprietor of a market to stock such confections with but a slight risk of unauthorized and unpaid-for taking of individual bars.

It is another object of the invention to provide a container which is easily picked up and carried and which lends itself to efficient storage not only in the distributor's truck and in the market's frozen food cabinets but also in the refrigerator of the average home.

It is still another object of the invention to provide a container which discourages unauthorized removal of any of the bars from the container, yet which permits of convenient and orderly bar removal in the hands of the purchaser of the box itself.

It is a further object of the invention to provide a container which encourages the bulk marketing and promotes the sales of frozen confection bars.

It is a still further object of the invention to provide to the manufacturer of such bars a highly efficient and economical mechanism for loading frozen confections into the containers.

It is yet a further object of the invention to provide a loader which is relatively inexpensive and can easily be integrated into an existing frozen confection production line operation.

It is another object of the invention to provide a loader which is readily mounted below a stick holder of conventional size and style and is adapted to handle the number and kind of frozen confection customarily found in the usual stick holder.

It is yet another object of the invention to provide a loader which retards somewhat the downward velocity of the bars as they are directed into their containers and which therefore reduces the likelihood or risk of harm from impact shattering as loading takes place.

It is still another object of the invention to provide a loader which vastly increases the rate of packaging over that obtainable by hand loading.

It is a further object of the invention to provide a loader which permits the manufacturer to package the output of a single stick holder, customarily holding two dozen bars, into two separate containers holding one dozen bars apiece, and with each of the containers being of minimum and most economical size possible.

It is a yet further object of the invention to provide a container wherein the partitions augment the ability of the chute or loader to retard the effect of harmful impact stresses and to promote the integrity of the bars as they are packaged and subsequently handled.

It is another object of the invention to provide a container which, while it can easily be closed, can as easily be opened and permits removal of only a portion of the bars as desired.

It is yet another object of the invention to provide a generally improved frozen confection loader and container.

Other objects, together with the foregoing are attained in the physical embodiments described below and shown in the accompanying drawings in which:

Figure 1 is an isometric showing of the loader and subjacent pair of containers in a typical environment having a loaded stick holder disposed above the loader in confection releasing position.

Figure 2 is a plan of the loader.

Figure 3 is a longitudinal section, the plane of section being indicated by the line 3—3 of Figure 2.

Figure 4 is a transverse section, the plane of section being indicated by the line 4—4 in Figure 2.

Figure 5 is a modified form of container, or carton.

Figure 6 is a transverse section, the plane of section being indicated by the line 6—6 in Figure 5.

While the frozen confection loader and container of my invention are susceptible of numerous physical embodiments depending upon the particular environment and conditions of use, a substantial number of the herein shown and described devices have been made, used and sold and have performed in an eminently satisfactory fashion.

In the production of frozen confections, for example, chocolate coated ice cream and water ices, it is conventional practice to cast the confections into the form of a tapered bar 10 molded about a stick 11 projecting exteriorly from the bar for ease in handling the bar while being eaten.

During manufacture the upper end of the stick 11 is releasably clamped in a device termed a stick holder 12, whose construction is so well known in the art as to require no further explanation. Customarily, the stick holder 12 is supported on a pair of tracks 13 as it is moved from the mold defrosting station to the envelope packaging station in manners long known in the industry. Upon reaching the envelope packaging station it is the usual practice to trip a lever (not shown) on the stick holder and thus simultaneously releasing all sticks so as to permit the bars to drop downwardly and, usually, into machinery which packages the bars individually in envelopes. The individually wrapped bars are thereupon transported, in usual practice, to a boxing station where the bars are placed by hand into shipping cartons.

The loader and container of my invention not only eliminates the need for an envelope packaging machine but also obviates the expensive hand labor required to box the confections.

At an appropriate location on the production line, dictated by the particular environment and production line set-up, the stick holder 12 is brought to a stop, or indexed, by suitable mechanism (not shown) over a compartmented guide chute 16, or loading chute.

The great majority of stick holders are constructed so as to carry two dozen bars in the approximate scale showing and manner indicated in Figure 1. As can be seen in Figure 1, each of the bars is spaced a considerable distance from its nearest counterparts. Were the bars to be packaged with the same spaces between them that exist while they are on the stick holder, the package would not only be wastefully large but would also require exceedingly thick partitions to prevent damage to the bars during shipping. Furthermore, were the bars to be dropped from the stick holder directly downwardly into compartmented containers, impact of the bars on the bottom of the container would be likely to result in a fracture or shattering of the point 17, or even the sides 18 or faces 19 of the bars.

Consequently, the guiding chute 16 is constructed so as to funnel or converge the individual bars into containers 21 of minimum size, and to deflect the bars against at least one surface in each chute compartment so as frictionally to reduce somewhat the velocity of fall and to deflect the bars against at least one partition wall in the container in order further to slow the speed of descent and thus to minimize bar shattering and breakage. The chute 16, accordingly, is provided with a pair of downwardly converging side panels 26 and a pair of downwardly converging end panels 27, the side and end panels together forming a peripheral wall 31 whose upper margin 32 is of elongated rectangular shape circumscribing the imaginary envelope around the twenty-four bars suspended in the stick holder. In comparable fashion, the lower margin 33 of the peripheral wall 31 is of elongated rectangular configuration substantially coincident with the imaginary envelope around the two containers 21 in the spaced position of the containers shown in Figure 1.

It is apparent that the slant height of the peripheral wall 31 is a function of the wall angle or degree of slope or inclination of the wall. Conversely stated, the less the height of the wall, the greater the slope of the wall from vertical, and thus the greater the converging and speed reducing effect of the wall on the dropping bar. The nature of the bar and experience with slopes of differing extents will soon establish the optimum angle of inclination. The slopes approximately as shown in the drawings have been found very satisfactory for most types of bars.

As can be seen by especial reference to Figures 1 through 4, the loading and speed reducing chute 16 not only acts to converge the outermost bars dropped simultaneously from the stick holder, but owing to the provision of interior partitions 36, also serves to deflect in a central direction the innermost bars. Mounted vertically along the longitudinal vertical median of the chute is a center panel 37, or wall. Disposed on opposite sides of the center wall 37 and downwardly converging is a pair of longitudinal partition panels 38, or walls. As can be seen most clearly in Figures 2 and 4, the center panel 37, in conjunction with the pair of longitudinal partition panels 38 and chute side walls 26, form a plurality of longitudinal rows 41, or chambers, each bounded by an inwardly and downwardly inclined longitudinal wall surface.

In somewhat comparable fashion, a plurality of transverse partitions are provided. Intersecting adjacent the upper margin 32 of the chute along its transverse central or median plane is a pair of transverse dividing panels 46, or walls, and downwardly diverging as appears most clearly in Figures 1 through 3. The dividing panels form in side elevation, as shown in Figure 3, an isosceles triangle whose base 47 dimension substantially coincides with the distance between the adjacent or facing walls of the pair of containers 21. While the boxes 21 would ordinarily be placed in a location most suited to the environment, and probably in many instances would be located in face to face or abutting relation, the combined thickness of the two abutting container walls would ordinarily require that the chute dividing panels 46 be placed at some appropriate downwardly diverging attitude. The speed reducing effect of the sloping walls likewise militates in favor of at least some degree of downward divergence of the dividing panels 46.

Disposed in mirror symmetry on each of the opposite sides of the dividing panels 46 is a transverse panel 47 and a transverse panel 48, each downwardly convergent with the other and with respect to the adjacent dividing panel 46 and chute end wall 27, and with them forming a plurality of transverse tiers 49, each of the tiers being bounded by at least one transverse and sloping surface.

It can therefore be seen that as a consequence of the unique intersecting partition and boundary walls heretofore described, each of the two dozen compartments 36 offer at least two inclined surfaces, and in some cases three, for example in central compartments 51 and 52, effective to converge and reduce the velocity of fall of the bars.

The containers 21 are placed immediately below the lower margin 33 of the loader so that as the bars pass through the chute compartments they are lodged in the appropriate compartments 61 in the containers, a conveyor belt or other similar device being especially satisfactory. Each of the containers, or cartons, comprises a bottom panel 62, a pair of side panels 63, a pair of end panels 64 and a top 66 preferably hinged to the upper margin 67 of one of the side panels and including an appropriate closure device such as a flap 68 bendable about a score line 69 adjacent the free end of the flap 68 and having located thereon a pressure sensitive adhesive 71 adapted to be sealed against the upper outer periphery 72 of the opposite side wall. It is to be recognized, of course, that closure can likewise be effected by other suitable means such as a tongue and slot, suit box or related types of closures.

Each of the boxes is provided with a plurality of longitudinal partitions 76 and transverse partitions 77, the number and arrangement of partitions being adjusted to correspond to the particular stick holder 12 being utilized.

It is especially to be noted that the box partitions are arranged so that they are in substantial register with the lower margin of the corresponding partitions in the loader. Thus, as the bars drop downwardly and are deflected or converged centrally they lodge in the proper compartments in the box. Furthermore, since all of the bars are inclined with respect to the vertical as they traverse the chute compartments the bars all strike against one or other of the box partitions prior to hitting the bottom of the carton. The somewhat flexible partitions, in other words, absorb some of the impact energy of the bars, slow the velocity of the bars and thus co-act or co-operate with the chute loader walls in substantially eliminating damage to the bars by impact fracture. Concurrently, the box partitions guide or direct the bars downwardly and into their proper, final vertical attitude.

After simultaneous loading of the two containers, the cartons may be transported elsewhere, as by automatic triggering of a conveyor belt switch actuated by loaded weight of the boxes, for closure of the box top and to storage or shipping.

The ultimate consumer is especially benefitted by the provision on each box top of a pair of tear lines 81, for example, intermittent perforations or scorings, in register with each of the transverse partitions 77, as appears most clearly in Figure 1. The tear lines discourage a casual and perhaps unauthorized person passing by a frozen food cabinet in a market from ripping open the carton and extracting one of the bars inside. However, the person who buys a whole box to take home and store in the home freezer, for example, is given convenient access to the contents, it being merely necessary to tear off a part or the whole of one of the three panel tiers 84 at a time along the adjacent score line. For some purposes, it may be convenient to score the top so as to form only longitudinal rows; for other uses it is found helpful to provide both transverse and longitudinal tear lines so that only that portion of the top immediately covering the bar to be eaten will be removed.

To make it easy for a shopper to lift and carry a carton a pair of spaced perforations or finger holds in the box top are frequently provided.

Figures 5 and 6 illustrate a modified form of container. The modification has interior partitions 91 integrally formed with a pair of side walls 92 and end walls 93, and a recessed top 94 hinged to the upper margin 95 of one of the sides. A hinged locking flap 96 on the upper margin of the other of the sides has molded therein a pair of outstanding knobs 97, or buttons, adapted to fit within a registering pair of apertures 98 in the adjacent box top lip 99. The box top can easily be snapped shut by deflecting inwardly the flap 96 and closing the lid until the buttons 97 engage with the apertures 98; opening can be just as conveniently effected, it being merely necessary to depress the buttons 97 until they are clear of the apertures. The molded partitions 91 in the modified form of container serve to lessen the impact force of the bars as they clear the chute loader fully as effectively as the form of container previously described; and, where the modified form of container is fabricated of a soft, papier-mache like material, serves even more effectively as a cushion. Furthermore, the partitions in the molded type of box, as appears most clearly in Figure 6 are conformed substantially to the shape and size of the bars themselves and thus serve most effectively to protect the bars against rattling, vibrations and shocks during subsequent handling, and additionally, the modified form of carton can economically be fabricated from a material having considerable insulating qualities. It has been found that the provision of a pair of finger holds 100 invites the prospective customer to lift the carton from the frozen food cabinet and to purchase the dozen bar container for use at home or on a picnic or other outing where the finger holds and the insulating qualities of the box are of especial value.

It can therefore be seen that I have provided a frozen confection container capable not only of safely and attractively packaging ice cream, water ice and other bars but also which is so constructed as to co-act or co-operate with a novel and highly useful loader in such a fashion as to make hand labor substantially unnecessary in bar packaging.

What is claimed is:

A guide chute for loading frozen confections from a stick holder into a pair of compartmented containers comprising a pair of downwardly and inwardly inclined end panels, a pair of downwardly and inwardly inclined side walls, a longitudinal vertical center wall, a pair of transversely disposed and downwardly diverging dividing walls symmetrical about the transverse axis of said container, a first pair of spaced transverse partition walls in downwardly converging attitude between one of said dividing walls and the adjacent of said end panels, a second pair of spaced transverse partition walls in downwardly converging attitude between the other of said dividing walls and the adjacent of said end panels, and a pair of longitudinal walls symmetrically disposed on opposite sides of said center wall in a downwardly converging attitude with respect to said center wall.

References Cited in the file of this patent

UNITED STATES PATENTS

| | | |
|---|---|---|
| 1,258,012 | Jedel | Mar. 5, 1918 |
| 1,288,442 | Retzbach | Dec. 17, 1918 |
| 1,920,605 | Steward | Aug. 1, 1933 |
| 2,423,332 | Mayer | July 1, 1947 |
| 2,647,679 | Schilling et al. | Aug. 4, 1953 |